United States Patent
Horn et al.

(10) Patent No.: US 9,874,495 B2
(45) Date of Patent: Jan. 23, 2018

(54) METHOD AND DEVICE FOR DETERMINING THE LAMBDA VALUE WITH A BROADBAND LAMBDA SENSOR OF AN INTERNAL COMBUSTION ENGINE, PARTICULARLY OF A MOTOR VEHICLE

(71) Applicant: Robert Bosch GmbH, Stuttgart (DE)

(72) Inventors: Christian Horn, Esslingen (DE); Andreas Michalske, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 14/771,999

(22) PCT Filed: Jan. 9, 2014

(86) PCT No.: PCT/EP2014/050262
§ 371 (c)(1),
(2) Date: Sep. 1, 2015

(87) PCT Pub. No.: WO2014/135287
PCT Pub. Date: Sep. 12, 2014

(65) Prior Publication Data
US 2016/0011077 A1    Jan. 14, 2016

(30) Foreign Application Priority Data
Mar. 8, 2013  (DE) ......... 10 2013 204 049

(51) Int. Cl.
*G01M 15/10*     (2006.01)
*F02D 41/12*     (2006.01)
(Continued)

(52) U.S. Cl.
CPC ......... *G01M 15/104* (2013.01); *F02D 41/123* (2013.01); *F02D 41/1456* (2013.01); *F02D 41/2474* (2013.01); *F02D 2200/0418* (2013.01)

(58) Field of Classification Search
USPC ............... 73/114.69, 114.71, 114.72, 114.73
See application file for complete search history.

(56) References Cited

U.S. PATENT DOCUMENTS

| | | | |
|---|---|---|---|
| 2009/0095049 A1* | 4/2009 | Graupner | F02D 41/1455 73/1.07 |
| 2010/0236532 A1 | 9/2010 | Xiao et al. | |
| 2011/0184700 A1* | 7/2011 | Michalske | F02D 41/1495 702/182 |

FOREIGN PATENT DOCUMENTS

| | | |
|---|---|---|
| DE | 42 08 002 | 9/1993 |
| DE | 198 31 748 | 1/2000 |

(Continued)

OTHER PUBLICATIONS

International Search Report for PCT/EP2014/050262, dated Apr. 7, 2014.

*Primary Examiner* — Eric S McCall
(74) *Attorney, Agent, or Firm* — Norton Rose Fulbright US LLP; Gerard Messina (57) ABSTRACT

In a method for determining the lambda value with a broadband lambda sensor of an internal combustion engine, a measurement current is supplied by the lambda sensor, which measurement current is proportional to the oxygen content or rich gas content in the exhaust gas of the internal combustion engine, and the corresponding proportionality factor is determined by a thrust comparison. The thrust comparison uses the $O_2$ concentration of dry air as reference, independent of an actually present air humidity, and the lambda value is calculated on the basis of a modified (Continued)

Pischinger conversion equation in which a signal supplied by a humidity sensor is taken into account.

11 Claims, 4 Drawing Sheets

(51) Int. Cl.
*F02D 41/14* (2006.01)
*F02D 41/24* (2006.01)

(56) References Cited

FOREIGN PATENT DOCUMENTS

| | | |
|---|---|---|
| DE | 102 16 724 | 10/2003 |
| DE | 103 31 159 | 1/2005 |
| DE | 10 2005 050 269 | 1/2007 |
| DE | 10 2006 011 722 | 4/2007 |
| WO | WO 2008/071500 | 6/2008 |

\* cited by examiner

METHOD AND DEVICE FOR DETERMINING THE LAMBDA VALUE WITH A BROADBAND LAMBDA SENSOR OF AN INTERNAL COMBUSTION ENGINE, PARTICULARLY OF A MOTOR VEHICLE

BACKGROUND OF THE INVENTION

1. Field of the Invention

The present invention relates to a method and to a device for determining the lambda value with a broadband lambda sensor of an internal combustion engine, e.g., of a motor vehicle, and a computer program that carries out all steps of the method according to the present invention.

2. Description of the Related Art

A broadband lambda sensor is known for example from German patent document DE 102 16 724 C1. The sensor is used to determine the oxygen concentration in the exhaust gases of internal combustion engines in order to obtain a control signal for adjusting a fuel-air mixture with which the internal combustion engine is operated. Such a lambda sensor has a measurement, or Nernst, cell, having a measurement electrode and a reference electrode that are situated on a solid electrolyte, and has a pump cell having an outer electrode and an inner electrode (also called the inner pump electrode). The inner electrode of the pump cell is situated, together with the measurement electrode of the Nernst cell, in a measurement chamber that is connected to the exhaust gas of the internal combustion engine via a diffusion barrier. The outer electrode is covered with a porous protective layer and is exposed directly to the exhaust gas.

In order to operate the lambda sensor, this sensor is connected to a control device that generates control signals in order to adjust the fuel-air mixture in the internal combustion engine. The Nernst cell is connected to the control device via clamps that belong to the measurement electrode and to the reference electrode. Between these clamps, a Nernst voltage can be picked off that is a function of the ratio of the oxygen concentrations to which the measurement electrode and the reference electrode are exposed. The pump cell is connected to the control device via clamps belonging to the inner electrode and outer electrode, at which clamps a pump voltage is present. The control device has a regulating circuit with which the pump voltage is adjusted as a function of the Nernst voltage.

A method and a device for controlling an internal combustion engine using such a lambda sensor is known for example from published German patent application document DE-OS 42 08 002. Here, from an acquired lambda value (ratio of air to fuel) and from a signal relating to the supplied air mass, the actually injected quantity of fuel is calculated, which is then compared to a signal relating to the quantity of fuel that is to be injected. Based on the difference between these two values, a pump characteristic field of an injection pump is adapted or corrected. With the pump characteristic field corrected in this way, the quantity of fuel to be injected corresponds to the actually injected quantity of fuel, and thus provides a very precise load signal, e.g. a load signal required for an exhaust gas recirculation.

In single cylinder injection systems, instead of the named pump characteristic field a control duration characteristic field for the injection valves is provided. In these fields, as a function of the quantity of fuel to be injected, it is stored how long the injection valves are charged with an electrical signal in order to achieve a particular opening duration or injection duration. In addition, for example from published German patent application document DE 103 31 159 A1, it is known that using the calculated deviation between the fuel quantity to be injected and the fuel quantity actually injected, it is also possible, or alternatively possible, to manipulate the air quantity in order to correct the fuel-air mixture.

In addition, from published German patent application document DE 198 31 748 A1, for the determination of the actual fresh air mass it is known not only to acquire the mass flow of the humid fresh air using an air mass sensor, but to correct this by the water vapor mass flow, because in the case of humid fresh air the same air mass flow supplies a lower oxygen mass flow for the combustion than in the case of dry fresh air. Moreover, the air-fuel ratio necessary for an optimal combustion is also a function of the air humidity, because given high air humidity a part of the effect of the exhaust gas recirculation is already anticipated, so that given high air humidity a higher lambda value is to be regarded as advantageous than in the case of low air humidity. This is based in particular on the fact that due to the air humidity the temperature in the combustion chamber is reduced. Due to the humidity-dependent oxygen content of fresh air, and the influence of humidity on the combustion temperature, in published German patent application document DE 198 31 748 A1 it is also provided to select the target value of the fresh air mass as a function of the air humidity.

According to published German patent application document DE 198 31 748 A1, the humidity content of the air is acquired by a humidity sensor, and on the basis of the acquired humidity an air mass correction is carried out of the actual fresh air mass, a lambda correction is carried out, and the target value calculation for the fresh air mass is carried out. In the air mass correction of the actual fresh air mass, measurement errors of the air mass sensor caused by the presence of the water vapor are also taken into account.

As is also known from published German patent application document DE 10 2005 050 269 A1, the conversion of the measured oxygen concentration into the named air-fuel mixture ratio (corresponding to the lambda value) standardly takes place according to the "Pischinger equation" (equation (1)) described below. In published German patent application documents DE-OS 42 08 002 and DE 198 31 748 A1, the resulting lambda value is then used in a fuel quantity calculation in order to carry out the above-named adaptation of the pump characteristic field of an injection pump.

The measurement current supplied by the lambda sensor is proportional to the oxygen content or rich gas content in the exhaust gas. Due to manufacture-related scatter, each such sensor has an individual proportionality factor. In order nonetheless to obtain the same characteristic curve for all sensors, i.e. the same measurement current for a given exhaust gas composition, an individual comparison can be provided in the sensor manufacturing process, e.g. by an electrical comparison resistor. Due to aging effects and environmental influences, the proportionality factor can additionally change. The deviation of the proportionality factor of a sensor (with or without comparison in the sensor manufacturing) from a nominal value is therefore standardly and predominantly determined, in diesel engines, using the so-called "thrust comparison." Here the fact is exploited that, in thrust switch-off phases of the fuel supply, the internal combustion engine flushes the lambda sensor with air, and, for this gas composition which is thereby known, determines the error of the proportionality factor. The ratio between the nominal and actual proportionality factor is stored as the "comparison factor," and is used for the multiplicative correction of the variable that characterizes the $O_2$ concentration.

In addition, it is known that the air humidity has an influence on the volume concentration, or the molar portion of $O_2$, in fresh air. This property of atmospheric air results from Dalton's Law, according to which the air pressure is equal to the sum of all partial pressures of the individual gases. Given constant air pressure and increasing air humidity, the $O_2$ partial pressure and $O_2$ volume concentration accordingly decrease (thinning effect). For a precise thrust comparison, the functional dependence of the expected $O_2$ value on the air humidity is therefore to be taken into account. German patent document DE 10 2006 011 722 B3 describes a possibility for how the humidity of the ambient air can be taken into account when determining the comparison factor. The comparison factor is then part of the proportionality factor for dry fresh air. From the comparison factor for dry air and an air humidity factor, the comparison factor for a particular air humidity level can then in turn be calculated, according to German patent document DE 10 2006 011 722 B3.

However, there are also engine control device functions in which the $O_2$ measurement value itself is not processed, but rather only the lambda value determined therefrom. In these cases, it is insignificant that the air humidity influences the thrust comparison, as long as the multiplicatively falsified $O_2$ concentration is converted into a correct lambda value using the appropriate humidity-dependent equations (1) and (2).

BRIEF SUMMARY OF THE INVENTION

The present invention is based on the idea of carrying out the named calculation of the lambda value on the basis of equations (1) and (2) in combination with a measurement value or signal supplied by an (air) humidity sensor.

The present invention enables the easy adaptation of a measured lambda value to changes in humidity taking place after a thrust comparison. The correction, named in published German patent document DE 10 2006 011 722 B3, of the comparison factor by the humidity influence is therefore no longer required. In addition, the present invention makes it possible to effectively compensate the influence of relatively fast changes in humidity on the lambda acquisition.

The present invention can preferably be used in diesel hybrid vehicles and conventional diesel vehicles that have a "coasting" operating mode, if the vehicles are equipped with a humidity sensor as named above, because in these vehicles a thrust comparison as named above is carried out only infrequently. The named coasting operation is a low-consumption operating state in which the internal combustion engine, i.e., in the present example, the vehicle engine, does not go into thrust operation in phases where the driver's requested torque disappears, but rather, with open clutch, goes into no-load operation or is shut off, and the vehicle continues to roll due to inertia.

Further advantages and embodiments of the present invention result from the description and the accompanying drawings.

Of course, the features mentioned above and explained below may be used not only in the indicated combinations, but also in other combinations, or by themselves, without departing from the scope of the present invention.

DETAILED DESCRIPTION OF THE INVENTION

Figure 1:
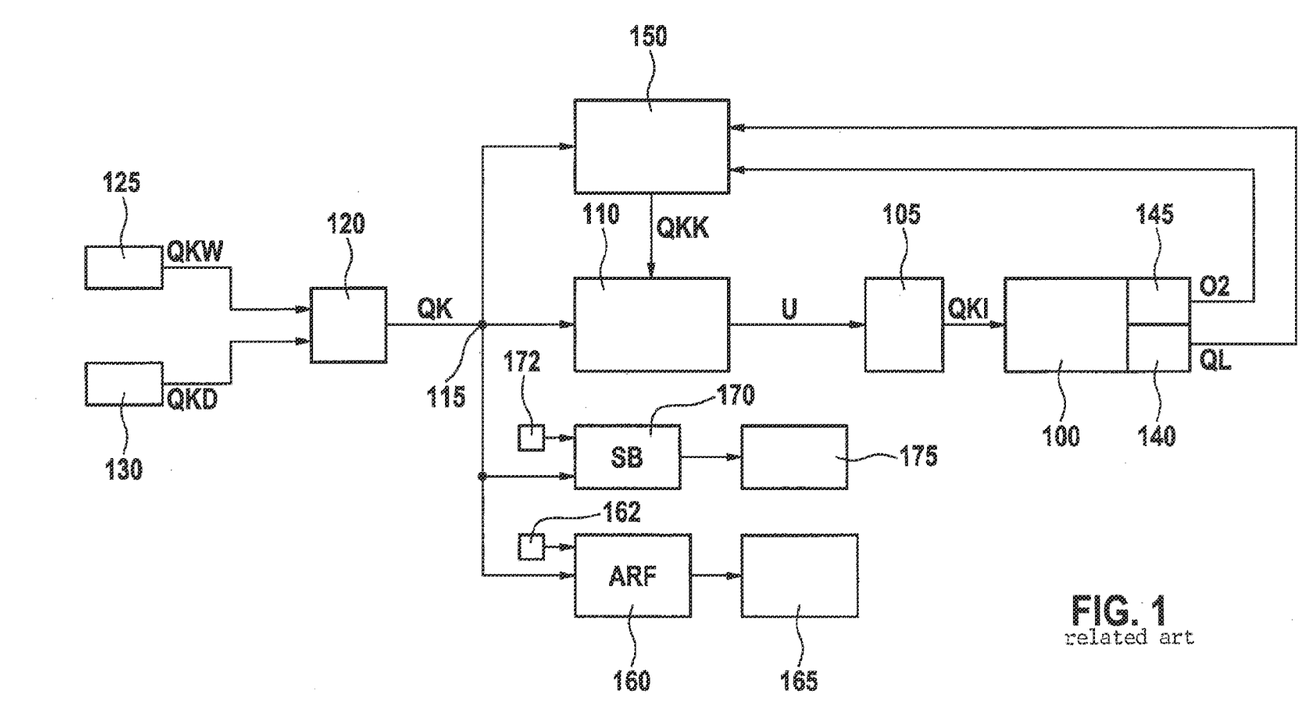
FIG. 1 shows a block diagram of a device known in the existing art for determining the lambda value with a broadband lambda sensor of an internal combustion engine of a motor vehicle.

FIG. 1 shows a schematic diagram of a device, known from published German patent application documents DE-OS 42 08 002 and 198 31 748 A1, for adapting the pump characteristic field of an injection pump based on the lambda value of a broadband lambda sensor. An internal combustion engine 100 receives a particular quantity of fuel QKI metered from an injection or fuel pump 105. Fuel pump 105 is connected to a pump characteristic field 110, which in turn is connected to a minimum selection unit 120 via a branching point 115. Minimum selection unit 120 receives a signal QKW from a target value specification unit 125, and receives a signal QKB from a limiter unit 130.

An air mass sensor 140 situated on the internal combustion engine supplies a first measurement quantity (QL) that characterizes the intake air mass. A lambda sensor 145 supplies a signal O2 that characterizes the oxygen content of the air. These signals are supplied to a correction device 150 that in addition receives output signal QK of minimum selection unit 120. Correction device 150 supplies a correction value QKK to pump characteristic field 110. In addition, the output signal of minimum selection unit QK is sent to an exhaust gas recirculation control stage 150 and to an injection beginning control stage 170. Signals from sensors 162 are also sent to exhaust gas recirculation control stage 160. The exhaust gas recirculation supplies signals to an exhaust gas recirculation actuator 165. The injection beginning control stage 170 receives output signals from various sensors 172, and provides signals to an injection beginning actuator 175.

During operation of this device, target value specification 125 provides a fuel quantity value QKW, i.e. the quantity of fuel that is required to operate the internal combustion engine with the speed, or torque, desired by the driver. As a function of various operating characteristic quantities, limiter unit 130 calculates a highest permissible quantity of fuel QKB. This highest permissible quantity of fuel QKB is dimensioned such that the internal combustion engine does not suffer damage, or the exhaust gas emissions do not exceed a specified value. Minimum selection unit 120 selects the smaller of the signals QKW and QKB. In this way, the desired quantity of fuel QKW is limited to the highest permissible quantity of fuel QKB. The value for the quantity of fuel QK to be injected is now present at the output of minimum selection unit 120.

In pump characteristic field 110 there is stored, as a function of the value for quantity of fuel QK that is to be injected, a signal U with which the fuel pump, or an actuating organ of fuel pump 105, is charged. As a result, fuel pump 105 dispenses actual fuel quantity QKI to internal combustion engine 100.

At branching point 115, the signal relating to the value for fuel quantity QK that is to be injected is supplied to further devices. Thus, as a function of the value for fuel quantity QK to be injected and the output signal of further sensors 162, exhaust gas recirculation control stage 160 provides a control signal to exhaust gas recirculation actuator 165. In order to make it possible to realize a combustion that is as free of exhaust gases and emissions as possible, the exhaust gas recirculation rate must be selected as a function of the actually injected quantity of fuel.

In addition, it is provided that the value for fuel quantity QK to be injected is supplied to injection beginning control stage 170. As a function of additional sensors 172, this injection beginning control stage 170 provides a control signal to injection beginning actuator 175. Here as well, it is important that a very precise signal relating to the injected quantity of fuel is supplied to the injection beginning control stage.

Sensors 145 and 140 acquire various operating characteristic quantities, and convey corresponding signals to correction device 150. Based on the sensor signals and on the value for quantity of fuel QK to be injected, this correction device 150 calculates correction values QKK with which the pump characteristic field is corrected. The correction of pump characteristic field 110 takes place in such a way that the signal relating to the value for quantity of fuel QK to be injected agrees with the injected quantity of fuel QKI.

In order to further reduce the emission of pollutants in the exhaust gas, a supply of fresh air that is as precise as possible is to be sought. In particular in diesel engines, the actual fresh air mass is regulated, via the exhaust gas recirculation, to a target fresh air mass that is specified corresponding to the operating point of the engine. Using signal O2 of sensor 145, which identifies the oxygen concentration in the exhaust gas, and using actual fresh air mass QL, the actual injection quantity is determined. On the basis of the knowledge of the actual injection quantity, target value errors for the exhaust gas recirculation can be reduced.

The mass flow of the humid fresh air is acquired by air mass sensor 140. In contrast, relevant for the combustion is the mass flow corrected by the water vapor mass flow, which characterizes the portion of the air that is available for the combustion. The air-fuel ratio that is necessary for an optimal combustion is, as described above, also a function of the air humidity.

The conversion of the measured $O_2$ concentration into a lambda value takes place on the basis of the following equation (1) (known as the Pischinger equation), where the physically correct $O_2$ concentration of the exhaust gas is to be used in the equation:

$$\lambda = \frac{1 + O_{2,Abg}/3}{1 - (1+z)O_{2,Abg}} \quad (1)$$

Here, $O_{2,Abg}$ is the concentration of the remaining oxygen in the exhaust gas, and $z=(1-O_{2,air})/O_{2,air}$, where $O_{2,air}$ is equal to the concentration of oxygen in the fresh air.

Because the oxygen concentration $O_{2,air}$ of fresh air is a function of the air humidity, the quantity z is also a function of the volume concentration, or molar portion w, of the water vapor, and is calculated as follows:

$$z = \frac{z^* + w}{1 - w} \quad (2)$$

Here the constant $z^*=(1-0.2095)/0.2095=3.7733$ is the value that holds for dry air. If a humidity sensor according to the existing art is not present or not used, the lambda value is calculated as follows by an engine control device (MSG):

$$\lambda_{MSG} = \frac{1 + O_{2,MSG}/3}{1 - (1+z^*)O_{2,MSG}} \quad (3)$$

Here, $O_{2,MSG}$ is the $O_2$ measurement value, including the comparison factor. If the influence of humidity is not taken into account in the thrust comparison, there then results the following relation between the physical oxygen concentration in the exhaust gas and the lambda value calculated in the control device:

$$\lambda_{MSG} = \frac{1 + \frac{1+F_{O2}}{1-w_{ALS}}O_{2,Abg}/3}{1 - (1+z^*)\frac{1+F_{O2}}{1-w_{ALS}}O_{2,Abg}} = \frac{1 + \frac{1+F_{O2}}{1-w_{ALS}}O_{2,Abg}/3}{1 - (1+z_{ALS})(1+F_{O2})O_{2,Abg}} \quad (4)$$

The factor $1+F_{O2}$ describes the relative $O_2$ error still remaining after the thrust comparison, to the extent that this error does not derive from the air humidity. The term $1-w_{ALS}$ is to be attributed to the influence, not yet taken into account, of humidity on the thrust comparison, where $w_{ALS}$ represents the physical water vapor volume concentration at the time of the thrust comparison and $z_{ALS}$ represents the value of z at the same point in time. Because the value of $w_{ALS}$ is much smaller than 1, the term $1-w_{ALS}$ in the numerator, which is an additional term compared to Equation (1), can be neglected, and the conversion is sufficiently precise as long as the previous thrust comparison was not too far in the past, and the value of $w_{ALS}$ thus still corresponds to the current air humidity with sufficient precision. Here, only the ratio $(1+F_{O2})/(1-w_{ALS})$, which corresponds to the comparison factor in the case of humid air, is present in the engine control device.

The approach according to the present invention described in the following enables a precise calculation of the lambda value even in the case in which the named temporal condition, or precondition, relating to the preceding thrust comparison is not met. This approach takes into account the humidity value provided by a humidity sensor.

In a first specific embodiment, $O_{2,MSG}$ in equation (3) is rescaled using the signal of a named humidity sensor as if the thrust comparison were repeated at the current air humidity. Because $O_{2,MSG}$ is significantly less than 1, in the numerator of equation (3) $O_{2,MSG}$ has only a small influence on the calculated lambda value $\lambda_{MSG}$ Correspondingly, in many cases it is already sufficient to carry out the humidity correction only in the denominator of equation (3). This leads to the following equation (5):

$$\lambda_{MSG} = \frac{1 + O_{2,MSG}/3}{1 - (1+z^*)\frac{1-w_{ALS}^{mess}}{1-w_{akt}^{mess}}O_{2,MSG}} \quad (5)$$

In equation (5), $w^{mess}_{akt}$ is the current measurement value of the water vapor volume concentration, $w^{mess}_{ALS}$ is the water vapor volume concentration at the time of the thrust comparison, and $O_{2,MSG}$ is the $O_2$ measurement value including the comparison factor, and therefore including the named multiplicative humidity error $1/(1-w_{ALS})$.

In the case of higher demands on precision, the numerator can be corrected in the same way. This then results in the following equation (6):

$$\lambda_{MSG} = \frac{1 + \frac{1-w_{ALS}^{mess}}{1-w_{akt}^{mess}} O_{2,MSG}/3}{1 - (1+z^*)\frac{1-w_{ALS}^{mess}}{1-w_{akt}^{mess}} O_{2,MSG}} \quad (6)$$

In further variant embodiments of the present invention, the fact is exploited that $w \ll 1$, and thus on the one hand $1/(1-w) \approx 1+w$, and on the other hand products of two water vapor volume concentrations are negligible. Correspondingly, in equations (5) and (6), replacements can be carried out in accordance with the following equation (7):

$$\frac{1-w_{ALS}^{mess}}{1-w_{akt}^{mess}} = \frac{1+w_{akt}^{mess}}{1+w_{ALS}^{mess}} = 1 + w_{akt}^{mess} - w_{ALS}^{mess} \quad (7)$$

In a further specific embodiment of the method according to the present invention, $O_{2,MSG}$ in the numerator is corrected only with the factor $1-w_{ALS}^{mess}$. In this way, the precision is further improved. In this case, according to the present invention the conversion is as follows:

$$\lambda_{MSG} = \frac{1 + (1-w_{ALS}^{mess})O_{2,MSG}/3}{1 - (1+z^*)\frac{1-w_{ALS}^{mess}}{1-w_{akt}^{mess}} O_{2,MSG}} \quad (8)$$

Equation (8) results from substituting equation (2) in equation (1), and compensating the divisor $1-w_{ALS}$, contained in $O_{2,MSG}$, as well as possible using the factor $1-w_{ALS}^{mess}$. Through repeated application of the approximations according to equation (7), further variants of the method according to the present invention can be derived from equation (8).

The above equations (5), (6), and (8), and modifications produced therefrom using equation (7), can be summarized as modified Pischinger equations that take into account the deviation of the air humidity from a reference value. In this procedure, the $O_2$ measurement value according to the existing art is compared during thrust to the value 20.95%, i.e. to the volume percent portion of $O_2$ in dry air, although the air may be humid, and the associated comparison factor is stored in a non-volatile storage device 225 of the named engine control device. In addition, reference value $w_{ALS}^{mess}$, or some other quantity characterizing this humidity, is also stored there.

Humidity sensors suitable for use in vehicles standardly acquire the relative air humidity. Using the intake air temperature, which is also to be measured, this humidity can first be converted into the specific air humidity x (water vapor content). In a further calculation step, the specific air humidity can be converted into the associated $H_2O$ volume concentration.

Figure 2A:
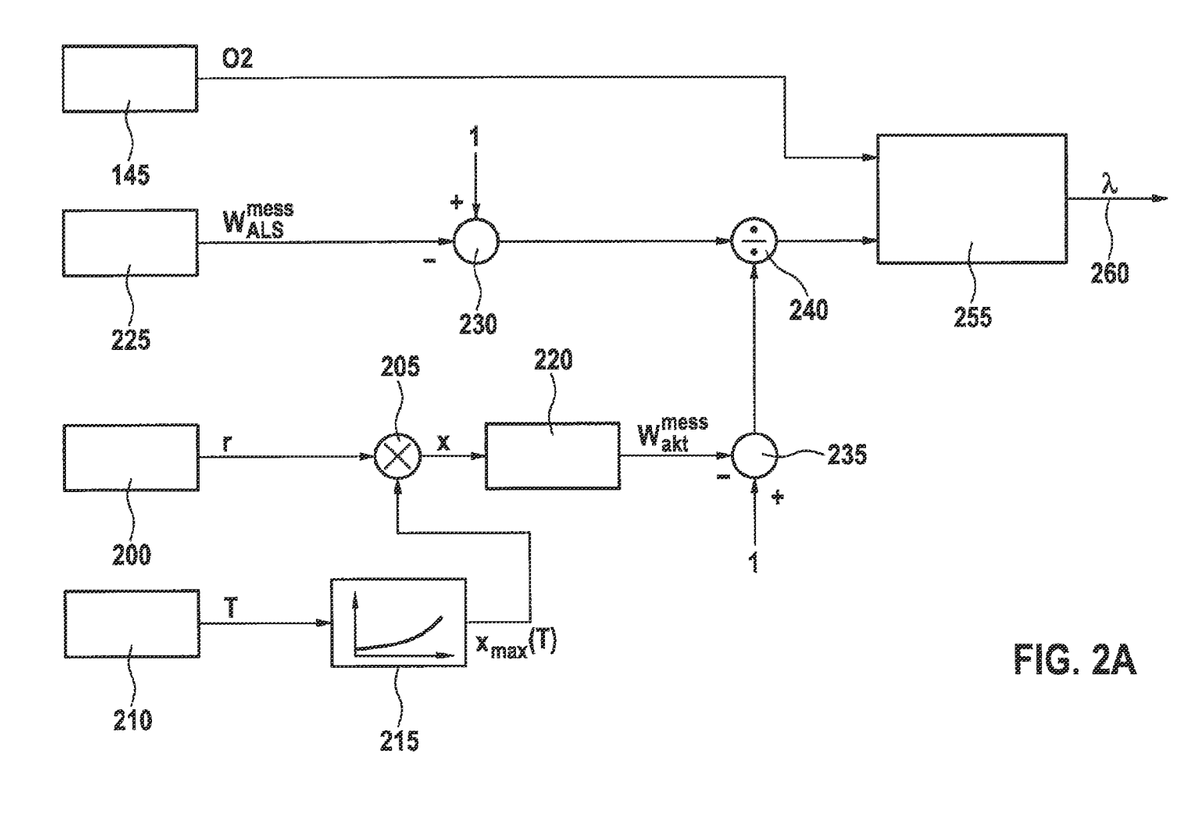
FIGS. 2a-c show combined schematic and functional diagrams of exemplary embodiments of the method and of the device according to the present invention.
Figure 2B:
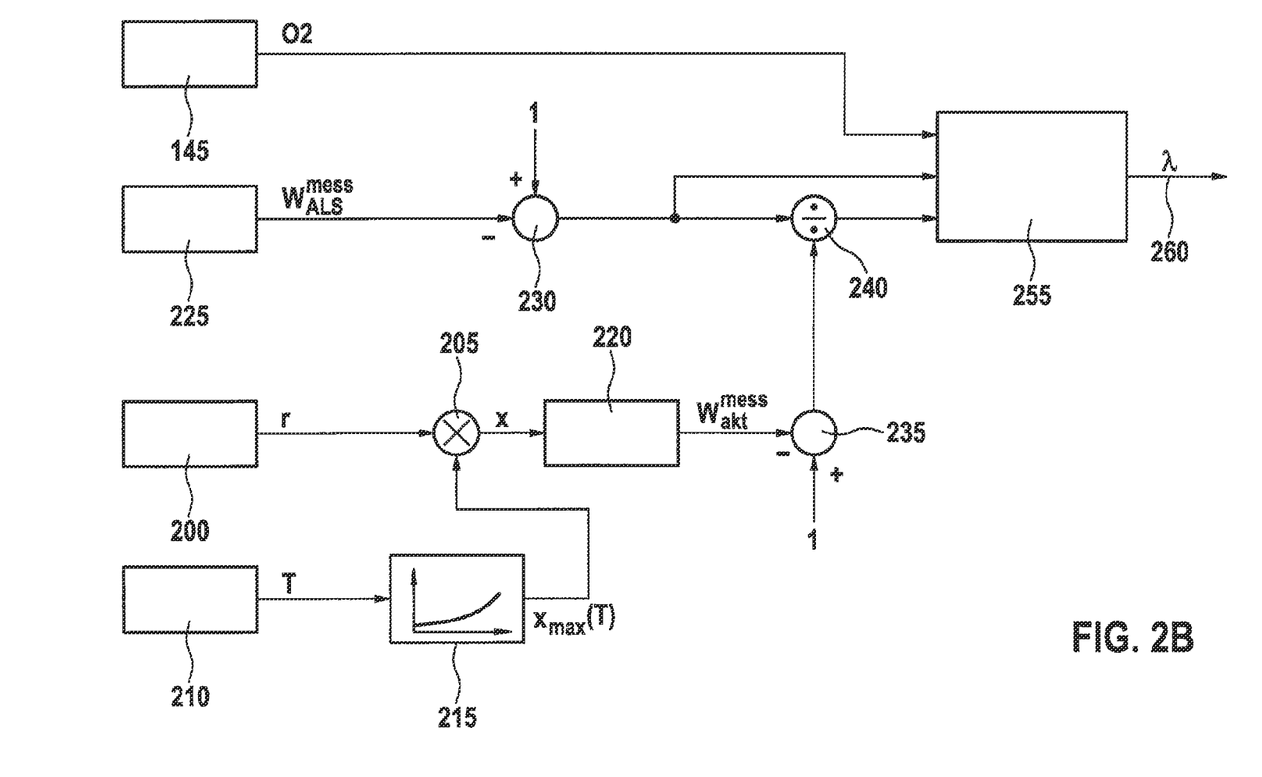
Figure 2C:
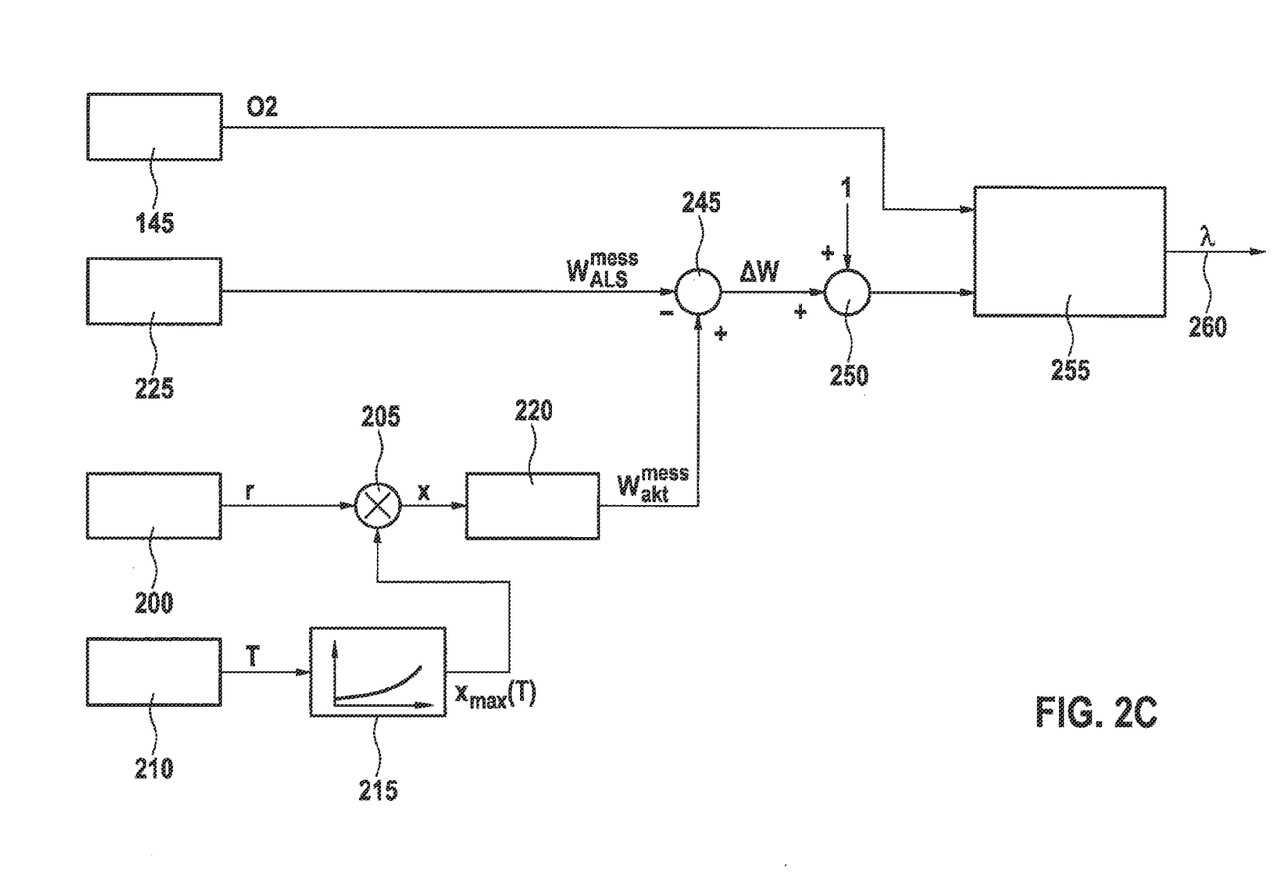

FIGS. 2a, 2b, and 2c show exemplary embodiments of the method according to the present invention and of the device, on the basis of a signal chain. The device includes a humidity sensor 200 that supplies a signal r that relates to the relative humidity of the intake air of the internal combustion engine. In addition, a temperature sensor 210 is provided that measures intake air temperature T. Using a characteristic curve 215, the measured temperature T of the intake air is converted into a signal, corresponding to the respectively measured temperature, of the saturation humidity $x_{max}(T)$.

The two signals r and $x_{max}(T)$ are provided to a multiplicative linkage point 205. Through this multiplication, from the relative humidity r there is formed a signal x relating to the specific humidity. Using a first conversion model 220, the signal x is converted into a value $w_{akt}^{mess}$ for the current water vapor volume concentration. The conversion factor used here $[1.607x/(1+1.607x)]$ results from the thermal state equation $p^*V=m^*R^*T$ for water vapor and dry air, the coefficient 1.607 indicating the ratio of the specific gas constants $R_W$ and $R_L$ for water vapor and air. The corresponding signal $w_{akt}^{mess}$, as well as the reference value $w_{ALS}^{mess}$ of the $H_2O$ concentration, which as described above is already stored in a storage device 225 and determined during the thrust comparison, are, depending on the specific embodiment, supplied to further linkage points described below, before in this way a measured $O_2$ measurement value O2, corrected by the thrust comparison, of lambda sensor 145 is converted into a lambda value 260, in a second calculation module 255.

In the exemplary embodiment shown in FIG. 2a, reference value $w_{ALS}^{mess}$ is supplied to a difference formation linkage point 230, and there it is subtracted from the value 1. Correspondingly, the current water vapor volume concentration $w_{akt}^{mess}$ is supplied to a difference formation linkage point 235 and is there subtracted from the value 1. Both of these differences are supplied to a dividing linkage point 240 that forms a quotient that characterizes the change in humidity. This quotient is supplied to calculation module 255, which, on the basis of equation (5) or (6), converts $O_2$ measurement value O2 (or $O_{2,MSG}$) into a lambda value 260.

In the second exemplary embodiment according to FIG. 2b, in contrast to FIG. 2a equation (8) is used in the calculation module, instead of equation (5) or (6). In this case, calculation module 255 is additionally provided with the difference $1-w_{ALS}^{mess}$, formed by linkage point 230.

In the third exemplary embodiment, shown in FIG. 2c, $w_{akt}^{mess}$ and $w_{ALS}^{mess}$ are supplied to a difference formation linkage point 245 according to equation (7), whereby the difference $\Delta w = w_{akt}^{mess} - w_{ALS}^{mess}$ is formed. This difference is in turn supplied to linkage point 250, which adds a constant value of 1. In calculation module 255, lambda value 260 is in this case calculated using the corresponding variant of equation (5) or (6), from O2 (or $O_{2,MSG}$) and the factor $1+\Delta w$.

The lambda value determined in this way can be further processed in a known manner in the context of a lambda regulation or a lambda-based adaptation, such as the named pump characteristic field adaptation of an internal combustion engine of a motor vehicle, or any other application that requires a precise lambda value.

What is claimed is:

1. A method for determining a lambda value, the method comprising:
   receiving a measurement current provided by a broadband lambda sensor of an internal combustion engine of a motor vehicle, the measurement current provided by the lambda sensor being proportional to one of an oxygen content or rich gas content in an exhaust gas of the internal combustion engine;
   determining, by a thrust comparison, a proportionality factor based on the measurement current, wherein the thrust comparison uses an $O_2$ concentration of dry air as reference, independent of an actually present air humidity; and calculating the lambda value on the basis of a conversion equation in which a signal supplied by a humidity sensor, which senses the humidity of ambient air to determine the dry air, is taken into account;

wherein the calculation of the lambda value takes place on the basis of one of the following conversion equations:

$$\lambda_{MSG} = \frac{1 + O_{2,MSG}/3}{1-(1+z^*)\frac{1-w_{ALS}^{mess}}{1-w_{akt}^{mess}}O_{2,MSG}}, \text{ or}$$

$$\lambda_{MSG} = \frac{1+\frac{1-w_{ALS}^{mess}}{1-w_{akt}^{mess}}O_{2,MSG}/3}{1-(1+z^*)\frac{1-w_{ALS}^{mess}}{1-w_{akt}^{mess}}O_{2,MSG}}, \text{ or}$$

$$\lambda_{MSG} = \frac{1+(1-w_{ALS}^{mess})O_{2,MSG}/3}{1-(1+z^*)\frac{1-w_{ALS}^{mess}}{1-w_{akt}^{mess}}O_{2,MSG}},$$

wherein $w^{mess}_{akt}$ designates a current measurement value of a water vapor volume concentration, $w^{mess}_{ALS}$ designates a water vapor volume concentration measured at the time of the thrust comparison, and $O_{2,MSG}$ designates an $O_2$ measurement value present in a control device of the internal combustion engine.

2. The method as recited in claim 1, wherein the calculation of the lambda value takes place on the basis of the conversion equation:

$$\lambda_{MSG} = \frac{1+\frac{1-w_{ALS}^{mess}}{1-w_{akt}^{mess}}O_{2,MSG}/3}{1-(1+z^*)\frac{1-w_{ALS}^{mess}}{1-w_{akt}^{mess}}O_{2,MSG}}$$

where $w^{mess}_{akt}$ designates a current measurement value of a water vapor volume concentration, $w^{mess}_{ALS}$ designates a water vapor volume concentration measured at the time of the thrust comparison, and $O_{2,MSG}$ designates an $O_2$ measurement value present in a control device of the internal combustion engine.

3. The method as recited in claim 1, wherein the calculation of the lambda value takes place on the basis of the conversion equation:

$$\lambda_{MSG} = \frac{1+(1-w_{ALS}^{mess})O_{2,MSG}/3}{1-(1+z^*)\frac{1-w_{ALS}^{mess}}{1-w_{akt}^{mess}}O_{2,MSG}}$$

wherein $w^{mess}_{akt}$ designates a current measurement value of a water vapor volume concentration, $w^{mess}_{ALS}$ designates a water vapor volume concentration measured at the time of the thrust comparison, and $O_{2,MSG}$ designates an $O_2$ measurement value present in a control device of the internal combustion engine.

4. The method as recited in claim 1, wherein the calculation of the lambda value takes place on the basis of the conversion equation:

$$\lambda_{MSG} = \frac{1 + O_{2,MSG}/3}{1-(1+z^*)\frac{1-w_{ALS}^{mess}}{1-w_{akt}^{mess}}O_{2,MSG}}$$

wherein $w^{mess}_{akt}$ designates a current measurement value of a water vapor volume concentration, $w^{mess}_{ALS}$ designates a water vapor volume concentration measured at the time of the thrust comparison, and $O_{2,MSG}$ designates an $O_2$ measurement value present in a control device of the internal combustion engine.

5. The method as recited in claim 4, wherein in the conversion equation used for the calculation of the lambda value, the quotient relating to a change in humidity since a preceding thrust comparison, $(1-w^{mess}_{ALS})/(1-w^{mess}_{akt})$, is simplified as the quotient $(1+w^{mess}_{akt})/(1+w^{mess}_{ALS})$.

6. The method as recited in claim 4, wherein in the conversion equation used for the calculation of the lambda value, the quotient relating to a change in humidity since a preceding thrust comparison, $(1-w^{mess}_{ALS})/(1-w^{mess}_{akt})$, is simplified as the expression $1+w^{mess}_{akt}-w^{mess}_{ALS}$.

7. The method as recited in claim 4, wherein:

for forming $w^{mess}_{akt}$ designating the current water vapor volume concentration, a signal r supplied by a humidity sensor and relating to a relative humidity of the intake air of the internal combustion engine and an intake air temperature T supplied by a temperature sensor are multiplied to form a signal x relating to a specific humidity, and the signal x is converted into $W^{mess}_{akt}$;

forming a quantity relating to a change in humidity since a previous thrust comparison from the value $w^{mess}_{akt}$ and the value $w^{mess}_{ALS}$; and calculating the lambda value based on (i) an oxygen measurement value corrected by the thrust comparison and (ii) and at least one of a quantity relating to the humidity and a quantity relating to the change in humidity, according to the conversion equation.

8. The method as recited in claim 7, wherein the intake air temperature T supplied by the temperature sensor is converted into a corresponding saturation humidity value $x_{max}$ (T) using a characteristic curve.

9. A device for determining a lambda value, comprising:

an interface for receiving a measurement current value provided by a broadband lambda sensor of an internal combustion engine of a motor vehicle, the measurement current value provided by the lambda sensor being proportional to one of an oxygen content or rich gas content in an exhaust gas of the internal combustion engine; and a calculation unit including a processor configured for:
(i) determining, by a thrust comparison, a proportionality factor based on the measurement current, wherein the thrust comparison uses an $O_2$ concentration of dry air as reference, independent of an actually present air humidity; and (ii) calculating the lambda value on the basis of a conversion equation in which a signal supplied by a humidity sensor, which senses the humidity of ambient air to determine the dry air, the signal relating to the relative air humidity of the intake air of the internal combustion engine;

wherein the calculation of the lambda value takes place on the basis of one of the following conversion equations:

$$\lambda_{MSG} = \frac{1 + O_{2,MSG}/3}{1-(1+z^*)\frac{1-w_{ALS}^{mess}}{1-w_{akt}^{mess}}O_{2,MSG}}, \text{ or}$$

-continued $$\lambda_{MSG} = \frac{1 + \frac{1-w_{ALS}^{mess}}{1-w_{akt}^{mess}} O_{2,MSG}/3}{1-(1+z^*)\frac{1-w_{ALS}^{mess}}{1-w_{akt}^{mess}} O_{2,MSG}}, \text{ or}$$

$$\lambda_{MSG} = \frac{1 + (1-w_{ALS}^{mess}) O_{2,MSG}/3}{1-(1+z^*)\frac{1-w_{ALS}^{mess}}{1-w_{akt}^{mess}} O_{2,MSG}},$$

wherein $w^{mess}_{akt}$ designates a current measurement value of a water vapor volume concentration, $w^{mess}_{ALS}$ designates a water vapor volume concentration measured at the time of the thrust comparison, and $O_{2,MSG}$ designates an $O_2$ measurement value present in a control device of the internal combustion engine.

10. The device as recited in claim 9, wherein a signal supplied by a temperature sensor and relating to intake air temperature T of the internal combustion engine is taken into account in the conversion equation.

11. A non-transitory, computer-readable data storage medium storing a computer program having program codes which, when executed on a computer, perform a method for determining a lambda value, the method comprising:
  receiving a measurement current provided by a broadband lambda sensor of an internal combustion engine of a motor vehicle, the measurement current provided by the lambda sensor being proportional to one of an oxygen content or rich gas content in an exhaust gas of the internal combustion engine;
  determining, by a thrust comparison, a proportionality factor based on the measurement current, wherein the thrust comparison uses an $O_2$ concentration of dry air as reference, independent of an actually present air humidity; and
  calculating the lambda value on the basis of a conversion equation in which a signal supplied by a humidity sensor, which senses the humidity of ambient air to determine the dry air, is taken into account;
  wherein the calculation of the lambda value takes place on the basis of one of the following conversion equations:

$$\lambda_{MSG} = \frac{1 + O_{2,MSG}/3}{1-(1+z^*)\frac{1-w_{ALS}^{mess}}{1-w_{akt}^{mess}} O_{2,MSG}}, \text{ or}$$

$$\lambda_{MSG} = \frac{1 + \frac{1-w_{ALS}^{mess}}{1-w_{akt}^{mess}} O_{2,MSG}/3}{1-(1+z^*)\frac{1-w_{ALS}^{mess}}{1-w_{akt}^{mess}} O_{2,MSG}}, \text{ or}$$

$$\lambda_{MSG} = \frac{1 + (1-w_{ALS}^{mess}) O_{2,MSG}/3}{1-(1+z^*)\frac{1-w_{ALS}^{mess}}{1-w_{akt}^{mess}} O_{2,MSG}},$$

wherein $w^{mess}_{akt}$ designates a current measurement value of a water vapor volume concentration, $w^{mess}_{ALS}$ designates a water vapor volume concentration measured at the time of the thrust comparison, and $O_{2,MSG}$ designates an $O_2$ measurement value present in a control device of the internal combustion engine.

* * * * *